United States Patent [19]

Rubright

[11] 4,081,879
[45] Apr. 4, 1978

[54] SEALING MEMBER
[75] Inventor: Phillip L. Rubright, Berkley, Mich.
[73] Assignee: Chemcast Corporation, Detroit, Mich.
[21] Appl. No.: 653,268
[22] Filed: Jan. 28, 1976
[51] Int. Cl.$^2$ .............................................. B65D 55/00
[52] U.S. Cl. ........................................ 16/2; 277/166
[58] Field of Search ...................... 16/2; 285/162, 196, 285/338, DIG. 22; 177/166

[56] References Cited
U.S. PATENT DOCUMENTS

| | | | |
|---|---|---|---|
| 2,420,826 | 5/1947 | Irrgang | 16/2 |
| 2,948,773 | 8/1960 | Hawes | 16/2 |
| 3,277,234 | 10/1966 | Dekko et al. | 16/2 |
| 3,508,292 | 4/1970 | Bond | 16/2 |
| 3,654,382 | 4/1972 | Rubright | 16/2 |
| 3,836,269 | 9/1974 | Koscik | 16/2 |

Primary Examiner—Robert I. Smith
Attorney, Agent, or Firm—Harness, Dickey & Pierce

[57] ABSTRACT

An improved sealing member utilizable as a plug button or grommet is disclosed. An annular locking portion made of a rigid material is integrally bonded to a flexible elastomeric body. For use as a grommet, the sealing member also has an opening in the center of the elastomeric body and a sealing surface projecting therefrom for engaging a member (wire, cable, or the like) to be supported thereby. The rigid annular shaped portion of the sealing member has a tapered shape and is slightly larger than the opening in which the sealing member is to be positioned; the member has to be tilted or cocked in order to be inserted in place. Once the rigid annular locking portion is inserted beyond the opening, the sealing member is securely held and locked in place by the outer edge of the annular portion. Once inserted, the sealing member seals the opening around the entire edge thereof. A secondary sealing means can also be provided in the form of a raised sealing ridge on the outer periphery of the flexible elastomeric body.

In another embodiment, the sealing member is adapted to be attached by screws to surround and seal an opening. A plurality of holes are provided in the rigid annular shaped portion of the sealing member; the screws are placed in these holes and attached to the surface around the opening. With this embodiment, the flexible elastomeric body is positioned over the opening and the rigid annular portion is used as a supporting surface of the screw means as well as the sealing member itself.

In still another embodiment, the entire sealing member, or at least the rigid annular portion thereof, is split or formed with a thin slot therein to more easily enable bundles of wires, cables and the like to be inserted in the center thereof. The split member also can be more easily inserted in an opening. A deformable metal ring can also be molded in the elastomeric portion of the sealing member to assist in closing and securely holding closed the split member.

17 Claims, 21 Drawing Figures

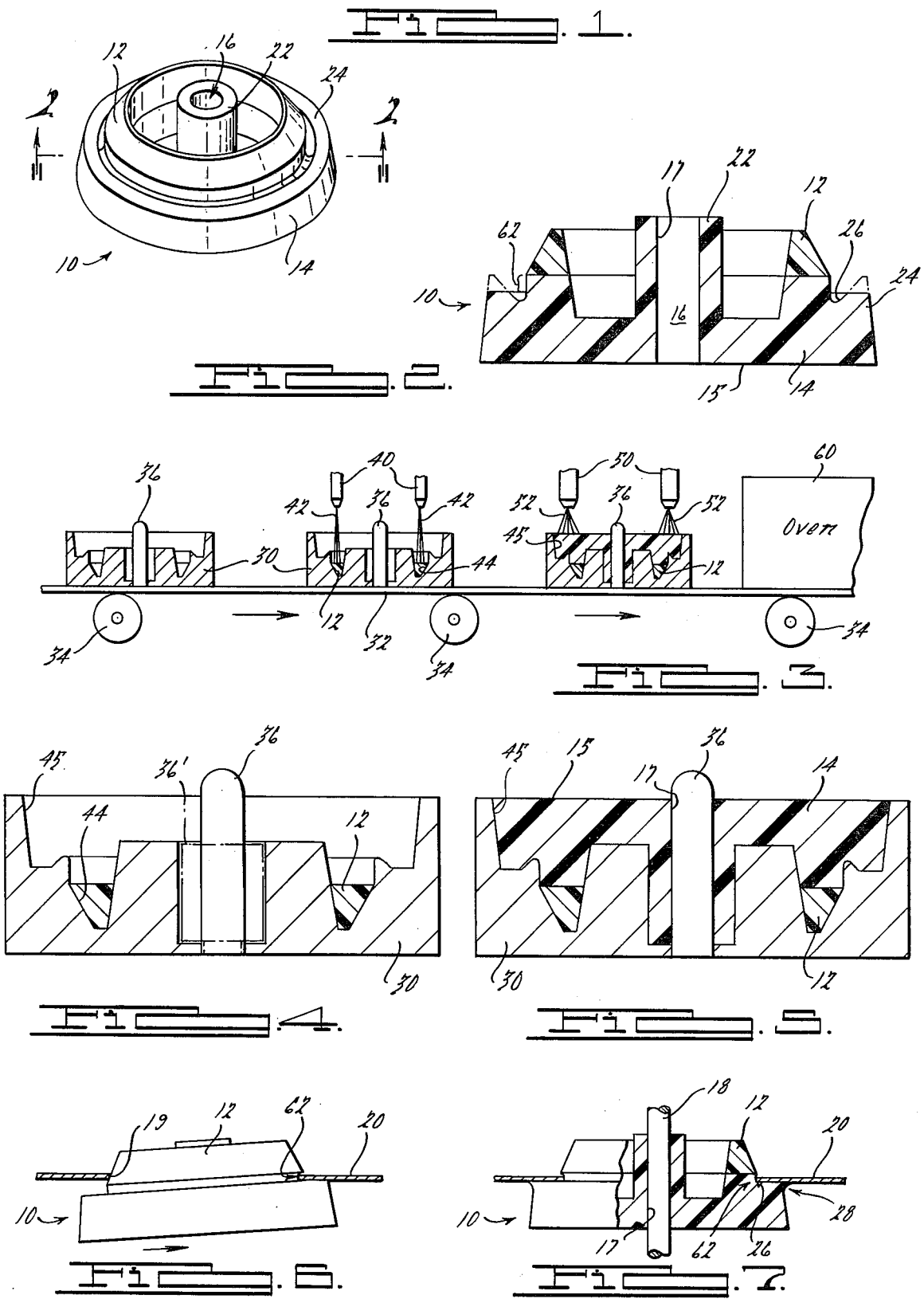

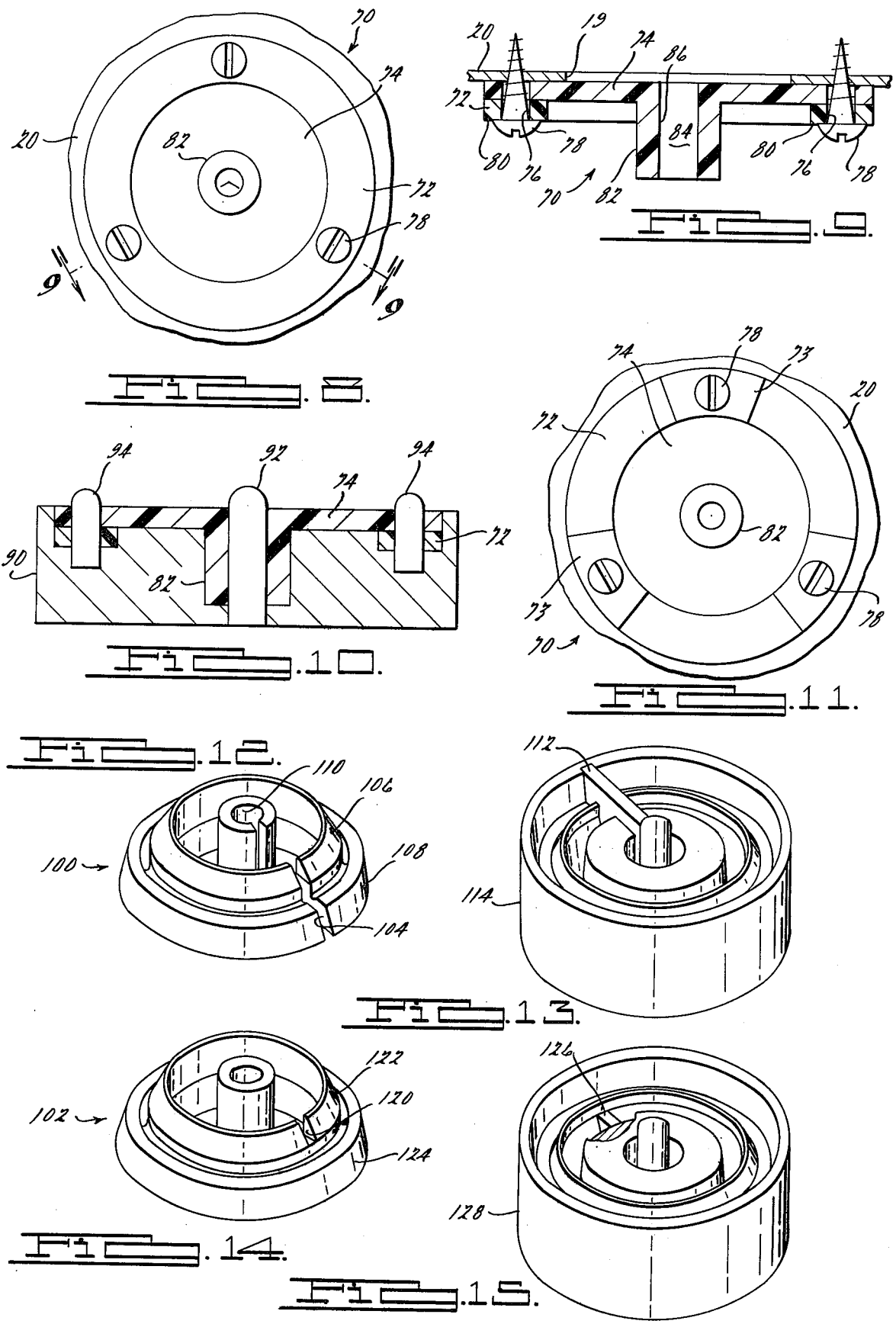

SEALING MEMBER

BACKGROUND — SUMMARY OF THE INVENTION

This invention relates to sealing members, such as plug buttons and grommets. Both plug buttons and grommets are utilized to seal openings in panels and other structures (particularly in automobiles and other vehicles), while grommets are also used to position, support and seal various members, such as wires, conduits, cables, rods, or the like, that extend through such panels. As a grommet, one embodiment of the present invention is an improvement over the grommet constructions shown in U.S. Pat. Nos. 3,182,119 and 3,654,382.

U.S. Pat. No. 3,182,119 discloses a grommet construction having an elastomeric outer body and a base member formed of a ring of non-elastomeric (metal) material embedded in the elastomeric body. A plurality of resilient fingers are formed on the base member and project axially from one side of the elastomeric body. One of the fingers is shaped in the form of a hook to engage the edge of an opening in a panel, and the other fingers are shaped in the form of spring members having portions shaped to resiliently snap by and engage the edge of the opening in a panel to pull the contacting surface of the elastomeric body into sealing engagement with the surface of the panel surrounding the opening. Thus, to mount this grommet in a panel opening, the hooked finger is first positioned over the edge of the panel opening and the grommet is then pushed against the panel until the spring fingers snap into engagement with the edge of the panel opening. The grommet can be removed from the panel when an axial force is applied to the grommet sufficient to overcome the spring force of the fingers to cause them to be resiliently disengaged from the edge of the opening.

U.S. Pat. No. 3,654,382 discloses another grommet construction having an elastomeric body with a base member embedded therein, the base member being a ring of non-elastomeric material (metal). A plurality of fingers having locking tangs struck therefrom are formed on the base member and project axially from one side of the elastomeric body. Each of the locking tangs extends outwardly from its respective finger and projects away from the outer end of the respective finger toward the main portion of the elastomeric body. The grommet construction also has a recess formed therein and a peripheral sealing ridge formed on it and projecting from one side to seal it with the surface of the panel. The recess is formed in one side to seal it with the surface of the panel. The recess is formed in one side of the elastomeric body and surrounds an axially extending projection formed on one side of the elastomeric body. The axial projection has a hole in it for support of a wire, conduit, cable, rod, or the like, which is positioned in it when the grommet is utilized in practice. The recess allows the member to deflect radially in the grommet without substantial difficulty and yet maintain a tight seal around it. When the grommet shown in U.S. Pat. No. 3,654,382 is mounted in a panel opening, the grommet is pushed axially toward the opening so that the fingers are inserted into it. Axial force is utilized on the grommet construction until the free ends of the locking tangs clear the opening whereupon the tangs snap outwardly into engagement with the opposite side of the panel holding the grommet securely in place.

Numerous sealing members often referred to as plug buttons are known today. These plug buttons are typically comprised of a relatively soft (or elastomeric) material throughout so that they can be inserted easily in place. These known plug buttons can be easily removed by an axial force sufficient to overcome the retention force of the relatively soft material in the opening.

An object of the present invention is to provide improved sealing members which, as grommet constructions, are improvements over the constructions shown in U.S. Pat. Nos. 3,182,119 and 3,654,382 and which, as plug buttons, are improvements over known plug buttons made of a single relatively soft material.

A further object of the present invention is to provide improved grommet constructions which are less expensive and easier to manufacture than known grommets, and also are self-locking, lock at all points around the edge of an opening, seal the opening from all adverse elements, and can be installed properly in only one manner.

Still another object of the present invention is to provide improved "screw-on" and "split-type" grommet constructions which are improvements over known grommet constructions.

The foregoing and other objects are achieved according to the present invention by means of a sealing member having an annular portion made of a rigid material castably affixed to an elastomeric body. For use as a grommet, the sealing member has an opening in the center thereof and a projection situated around the opening for engaging a member to be supported and sealed thereby. The rigid annular shaped portion of the sealing member is slightly larger than the opening in which the member is to be positioned and the member has to be tilted or cocked in order to be inserted in the opening. Once the rigid annular portion is inserted beyond the edge of the opening, it securely locks the sealing member in place and prevents it from being easily removed from the opening. The grommet is locked at all points around the edge of the opening and also seals the opening entirely around its edge. A raised sealing ridge can also be provided on the outer periphery of the flexible elastomeric body to provide a secondary seal relative to the opening.

As another embodiment of grommet construction, the sealing member is adapted to be screwed onto a panel and seal an opening therein. A plurality of holes are provided in the rigid annular shaped portion for placement of the screws. With this embodiment, the rigid portion is not inserted through the opening to lock the grommet in place, but instead is utilized as a support for the screws as well as the flexible elastomeric body.

The sealing member also can have a thin slot or split formed in it (at least formed in the rigid annular shaped portion) so that large cables or bundles of wire and cables can be inserted more easily through it. The slot or split also allows the sealing member to be inserted more easily in openings. A deformable metal ring can be molded in the elastomeric portion of this "split-type" sealing member to assist in closing the member after the wires, cables, etc., are inserted in it. After it is deformed and the split closed, the metal ring assists in securely holding the member in its closed position.

Other objects, advantages and features of the invention will become apparent from the following description taken in conjunction with the accompanying drawings.

BRIEF DESCRIPTION OF THE DRAWINGS

FIG. 1 is a perspective view of the inventive sealing member;

FIG. 2 is a sectional view taken along lines 2—2 of FIG. 1;

FIG. 3 illustrates a method of manufacture of the present invention;

FIG. 4 illustrates a mold used in the manufacture of the present invention and illustrates a step in the process of that manufacture;

FIG. 5 illustrates another step in the manufacture of the present invention;

FIG. 6 illustrates the manner in which the sealing member is to be mounted in an opening;

FIG. 7 illustrates an inventive sealing member fully mounted in an opening and sealingly supporting a wire, cable, or the like;

FIG. 8 is a top view of another embodiment of the present invention;

FIG. 9 is a sectional view taken along lines 9—9 of FIG. 8;

FIG. 10 is a sectional view of a mold used in the manufacture of an embodiment of the invention and illustrates the manner in which that embodiment is manufactured;

FIG. 11 illustrates another embodiment of the invention;

FIG. 12 illustrates still another embodiment of the invention;

FIG. 13 illustrates the mold used in the manufacture of the embodiment of the invention shown in FIG. 12;

FIG. 14 illustrates another embodiment of the invention;

FIG. 15 illustrates the mold used in the manufacture of the embodiment of the invention shown in FIG. 14;

DESCRIPTION OF THE PREFERRED EMBODIMENTS

Figure 16:
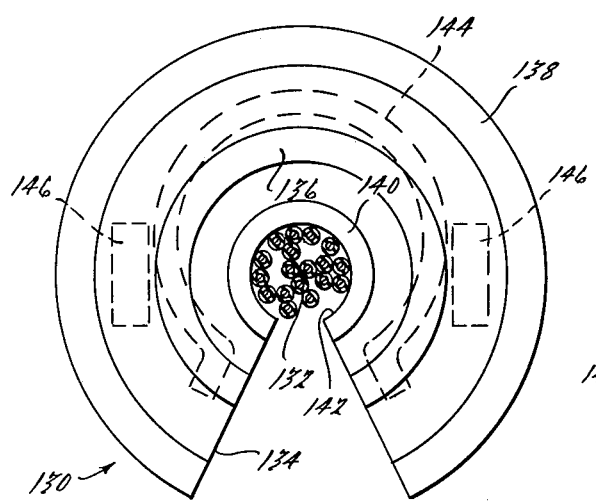
FIG. 16 is a top view of a further embodiment of the invention.

FIG. 1 illustrates a preferred embodiment of the improved sealing member of the present invention. The sealing member is indicated generally by the reference numeral 10.

The sealing member 10 comprises a rigid annular locking portion 12 and a softer (elastomeric) body portion 14. When used as a grommet, the body or base portion 14 has an opening 16 therein having an inside sealing surface 17 thereon. The surface 17 is adapted to engage a member 18 so the member 18 will be supported by the sealing member 10 through an opening 19 in a panel (as shown in FIG. 7). The member 18 may be a wire, conduit, cable, rod, or the like, that is desired to extend through the panel 20. An axially extending projection 22 is formed on one side of the elastomeric body portion 14. The opening 16 in the body portion 14 extends through the projection 22. The axial projection 22 provides a sufficient length of sealing surface 17 to insure that the member 18 remains sealed in the grommet 10 at all times regardless of the manner in which the grommet is subsequently used.

Grommet constructions are used where it is necessary or desirable to prevent vibration of a member which has to be inserted through a panel and also to seal the opening in the panel to prevent the passage of air, moisture, and/or sound through it. In some cases, grommets also are used to electrically insulate the member from the panel. Providing the body or base 14 of a relatively soft, flexible (elastomeric) material also allows the member 18 to radially deflect or be skewed in the opening 19 and allows the member 18 to be inserted more easily through the opening 16. The elastromeric material also insures that a satisfactory seal is provided along surface 17 and the member 18.

The sealing member 10 seals the opening 19 in the plate, panel, or the like 20 in which it is inserted completely around the edge of the opening. This is shown in FIGS. 6 and 7 and will be described in more detail hereinafter. The member seals the opening 19 around the circumferential area or sealing band surface on the elastomeric body portion 14 indicated generally by numeral 62 (FIGS. 2, 6 and 7). This is the primary sealing mechanism of the member 10.

A secondary sealing mechanism also is formed on the member 10. This is sealing ridge 24 which is castably formed on the outer peripheral edge of the elastomeric body portion 14. When the sealing member 10 is inserted in the opening 19 of a panel 20, the sealing ridge 24 (at least the upper part thereof) is flattened into sealing engagement with the surface of the panel 20 surrounding the opening 19. (This is shown in FIG. 7 and indicated by numeral 28.) For this purpose, a recess 26 preferably is provided immediately adjacent the radially inner edge of the sealing ridge 24. The recess 26 allows sufficient expansion space and flexibility for the sealing ridge 24 to flatten against the panel 20. The sealing ridge 24 preferably extends axially from the main body of the elastomeric portion 14 a sufficient distance so that when the sealing member 10 is inserted in the opening of the panel 20, the upper end of the sealing ridge 24 will flatten and seal against the panel 20. In this regard, the sealing ridge should extend to approximately the position of portion 62 indicated in FIGS. 2 and 7 which is satisfactory in most cases to provide a sufficient seal. To insure a seal along ridge 24 in all cases, it is possible to provide a sealing ridge which extends in an axial direction up to or beyond the interface between the rigid portion 12 and elastomeric portion 14, as shown in dashed lines in FIG. 2.

The annular locking portion 12 of the sealing member 10 is preferably comprised of a rigid castable material, such as a castable resinous material, either a thermoplastic or thermosetting resin, or any mixtures thereof, for example, polyurethane or polyvinyl chloride. The portion 12 also should be made of a material that is sufficiently hard and rigid so that it cannot be radially compressed, such as when it is inserted in the opening 19 in the panel 20. Materials having a durometer hardness reading of 70 Shore A or harder are suitable in this regard.

The portion 12 can be of any appropriate size and shape, but preferably has a tapered cross-section. With such a shape, the relatively pointed upper end of the portion 12 allows for easy locating and positioning of the sealing member 10 in the opening 19. The wider, lower end of the portion 12, especially the outermost edge thereof, provides a locking ridge for securely holding the member 10 in place once the entire portion 12 has been maneuvered through the opening 19.

The body portion 14 of the sealing member 10 is preferably made of an elastomeric material and is softer than the material used for the locking portion 12. In this regard, the material used for the base portion 14 should allow the portion 14 to be deflected and flexed without damage. The material of the portion 14 may be resilient rubber, foam rubber, polyurethane, soft vinyl, or any elastomeric foam plastic or plastisol. Several examples of suitable materials for the portion 14 are disclosed in the aforementioned U.S. Pat. No. 3,182,119. Also, the material utilized should have a durometer hardness reading of 60 Shore A or lower.

The body portion 14 should be of an elastomeric material so that the surface 17 in opening 16 will seal satisfactorily with member 18, so that member 18 can be inserted relatively easily through the opening 16 and be movable radially in the sealing member 10, so that the sealing band surface 62 of the sealing member 10 will seal with the edge of opening 19, and so that the sealing ridge 24 (if provided) may satisfactorily mate with the panel 20 and secondarily seal the opening 19.

The materials utilized for the portions 12 and 14 should be complementary in the sense that they will adhere and bond together satisfactorily. If the materials do not bond satisfactorily, the member 10 will be pulled or torn apart during insertion and use along the bonding interface between portions 12 and 14. In this regard, it is possible to provide portions 12 and 14 of different hardnesses (or densities) of the same material. For example, the annular portion 12 can be made of relatively hard vinyl material and the body portion 14 can be made of a relatively soft (elastomeric) vinyl material.

A method of forming the present invention is shown in FIG. 3. A number of identical open-ended die molds 30 are positioned on a movable assembly line or conveyor belt 32 of any conventional type. The line 32 is supported and transported by a series of rollers 34. The line 32 proceeds in the direction of the arrows and is operable by either providing one or more driving rollers 34 or a motor of any conventional type (not shown) connected to the line 32.

The molds 30 are preferably metal castings, such as aluminum, and are fabricated and oriented such that the entire sealing member 10 is formed in the center thereof. Due to the shape of the preferred embodiment of the inventive sealing member 10, the die molds are one-piece molds and can be manufactured by a simple turning or reaming operation on a lathe or similar machine. In order to form the opening 16 for the grommet constructions, a pin or rod member 36 is positioned in the center of the die mold 30. Sealing members other than grommet constructions, such as plug buttons, normally do not have an opening in them. Thus, when plug buttons are to be formed on the line 32, the pins 36 are removed from the molds 30 and plug members 36' are provided (as shown in dashed lines in FIG. 4).

The mold 30 on the left-hand side of FIG. 3 is empty and ready to be filled with material to form a sealing member. As the molds 30 are carried downstream on the line 32 (to the right in FIG. 3), they are moved to a position when they are directly under a first set of nozzles 40. The nozzles 40 are regulated and adapted to spray a certain amount of material 42 into the recesses 44 of each of the molds 30 to form the annular locking portion 12. The material 42 is in a liquid state when it is sprayed into the molds 30 and thus spreads throughout each of the recesses 44 forming annular portions 12 of relatively constant cross-sectional size and shape.

At the next stage of the manufacturing process, the molds 30, with the material for the portions 12 contained therein, travel along the line 32 until they are positioned beneath a second set of nozzles 50. The nozzles 50 are regulated and adapted to spray a certain amount of material 52 into the remaining recesses 45 of each of the molds 30 forming the base portions 12 of the sealing members 10. Since the material 52 is in a liquid state when it is introduced in the molds 30, it spreads throughout and substantially fills each of the recesses 45. Also, the amount of material 52 is regulated so that the level thereof will reach approximately to the top of the molds 30. A relatively smooth surface 15 is formed on each of the members 10. This is shown in detail in FIG. 5.

As the molds 30 proceed along the line 32, they pass into or through a curing oven 60 which cures and sets the materials. The materials 42 and 52 are simultaneously cured and bonded together forming the completed sealing member 10. The appropriate temperatures for the oven and the appropriate times necessary to set and cure the materials are well known in the art and primarily depend on the type of materials utilized. Generally, however, the curing time is on the order of 5 to 15 minutes and the curing temperature is on the order of 300°–500° F.

In use, the sealing member 10 is typically mated in an opening on a panel (as illustrated in FIGS. 6 and 7). The rigid locking portion 12 is first inserted through the opening. The outer diameter of the top of the portion 12 is sufficiently less than the diameter of the opening 19 and provides for easy location and positioning of the member 10 at the opening. The outer diameter of the lower (or base) portion of the locking portion 12, however, is larger than the opening 19. Because the material forming the portion 12 is sufficiently rigid and as a result the portion 12 cannot be radially flexed or compressed, the portion 12 cannot be inserted axially directly through the opening 19. Instead, it is necessary to cock or skew the member 10 in order to insert it in the panel 20. The manner in which the member 10 must be inserted is shown in FIG. 6. First, one side of the portion 12 is inserted through the opening 19 and force is then applied in the direction shown by the arrow in FIG. 6 causing the edge of the opening 19 to be compressed into the portion 62 of the member 10. The portion 62 is part of the elastomeric body portion 14 and will deflect radially inwardly by a sufficient amount. Then, the other side of the member 10 is pushed toward the panel 20 until the entire extent of the portion 12 is positioned through the opening 19 and the member 10 snaps into place. This is shown in FIG. 7. Since, as indicated above, the outside diameter of the lower (and largest) part of the portion 12 is slightly larger than the opening in the panel 20, that part will securely fix and lock the member 10 in position in the opening. The lower outer edge of the portion 12 acts as the locking means or ridge in this regard. The member 10 thus is self-locking and once it is inserted in a panel is extremely difficult to dislodge; it cannot be dislodged by mere axial force in a direction opposite to which it was inserted.

While the panel 20 is illustrated as having a flat surface surrounding the opening 19, the features of the present invention are such that a panel having a concave, convex, recessed, raised, or other non-flat or irregular surface can be sealed effectively by the member 10. As shown in FIG. 7, the sealing member 10 seals the opening 19 along the portion indicated by numeral 62. This is the primary seal between the member 10 and the panel 20. The sealing member also can seal the opening 19 along the sealing ridge 24.

Also, it is understood that although the sealing member 10 has been shown in circular shape, it can be of any non-circular shape as required for the job application. It is expected that most grommets and plug buttons will be circular, however, as they are easier to manufacture in that shape and, in most job applications, the holes or openings requiring sealing members are circular.

When the sealing member 10 is used as a grommet, it provides numerous advantages and benefits over the grommet constructions shown in U.S. Pat. Nos. 3,182,119 and 3,654,382. For example, the molds 30 utilized to manufacture the present invention are simpler in design and fabrication. Merely a turning or reaming operation on a lathe or similar machine is necessary in order to form the molds. Complicated drilling, reaming or other methods of forming the appropriate odd-shaped recesses in the molds are unnecessary. This substantially reduces tooling and construction costs for the molds.

Also, the grommet constructions shown in the two aforementioned U.S. patents utilize metal inserts which are embedded in them. By eliminating the metal inserts, the present invention eliminates the cost of manufacturing, buying, and handling such inserts. The plastic or other material utilized to form the locking portion 12 of the grommet 10 is less expensive than the metal inserts. Grommets in accordance with the present invention also are more reliable; burrs and other defects often encountered with the metal inserts are not present and the grommets do not have a tendency to tear apart or mold improperly as the known constructions. Also, defects in the metal inserts can cause known grommets to operate improperly or to deteriorate during use.

There is some difficulty in utilizing known grommet constructions when the panels are not flat. Often one or more of the fingers would not be inserted sufficiently through the opening and thus all of the locking tangs would not be positioned correctly to function. Grommets inserted in this manner have a tendency to dislodge or "pop-out" during use. On the other hand, with the present invention there is only one proper manner in which the sealing member can be installed. The locking portion 12 must be inserted so that it is completely on the opposite side of the panel 20 or the grommet construction will not stay in place. Accordingly, it is easy for the person installing the inventive sealing member to determine whether or not it is inserted satisfactorily; he cannot be misled into believing that an improper insertion is satisfactory.

The present grommet construction is also less subject to being dislodged or "backed-out" of an opening. It is locked 360° around its periphery in an opening, rather than locally at three or four positions as disclosed in the aforementioned U.S. patents. Moreover, even if the panel 20 is warped so that the peripheral sealing ridge does not mate or meet with the panel completely around the circumference thereof, the present invention provides a satisfactory water-tight seal. When the grommet 10 is inserted in the panel 20, the edges of the opening 19 seal 360° around the outside of the grommet at portion 62.

Another embodiment of the present invention is shown in FIGS. 8-11. This embodiment is adapted to be screwed onto a plate, panel, or the like and thus is commonly referred to as a "screw-type" grommet or sealing member. As shown in FIGS. 8 and 9, the sealing member 70 comprises a rigid annular portion 72 and an elastomeric body portion 74. The portions 72 and 74 are similar to the corresponding portions 12 and 14 described above and are preferably comprised of the same materials.

The rigid portion 72 comprises an annular shape and is positioned approximately on the outer periphery of the sealing member 70. A plurality of holes or openings 76 are provided in the portion 72 for placement of screws 78 or other fastening means which are to be utilized to securely fasten the member 70 to the panel 20. Although three holes 76 and screws 78 are shown in the embodiment disclosed in FIGS. 8 and 9, it is understood that any number can be provided and utilized to fasten the member 70 to the panel 20. In order to provide satisfactory mounting places for the screws 78, flattened areas 80 are provided on the rigid portion 72 adjacent each of the holes 76. The remainder of the rigid portion 72 can be a different shape, such as tapered (FIGS. 1-7), or the entire rigid portion 72 can be in the shape of a flattened ring (similar to a washer in shape).

The elastomeric body portion 74 seals the opening 19 in the panel 20. The rigid annular portion 72 supports the portion 74 and also, when the member is fastened in place, securely presses the portion 74 into sealing engagement with the panel 20 entirely around the periphery of the member 70.

For use as a grommet and to sealingly engage, position and hold one or more wires, cables and the like, an axially extending portion 82 having a hole or channel 84 and a sealing surface 86 therein is provided on the member 70. The axial portion 82, hole 84 and surface 86 are the same as, and function in the same manner as, the projection 22, opening 16 and surface 17, respectively, described above with reference to FIGS. 1-7.

The "screw-type" embodiment 70 is formed in essentially the same manner as the embodiment 10 described above. An open-topped mold 90 having the appropriate internal shape and recesses is positioned on a movable casting and curing line (as described with respect to FIGS. 3-5). Material is first sprayed or inserted into the mold 90 to fill the annular recess corresponding to the portion 72 of the completed member 70. The mold is then filled with a second material to form the body portion 74. The filled mold is then subjected to curing to complete the member 70. In the mold 90, a pin or rod 92 is provided to form the opening 84 in the finished member 70. Also, a plurality of projections, pins, or rods 94 are provided around the periphery of the mold to form the openings 76 for the screws or other fastening means.

Another embodiment of the "screw-type" sealing member 70 is shown in FIG. 11. In this embodiment, the rigid annular portion 72 is made relatively thin and raised portions or plateaus 73 are provided thereon in the areas surrounding each of the openings 76. The raised portions 73 provide added support where the screws are to be positioned to secure the member 70 to the panel 20.

Figure 17:
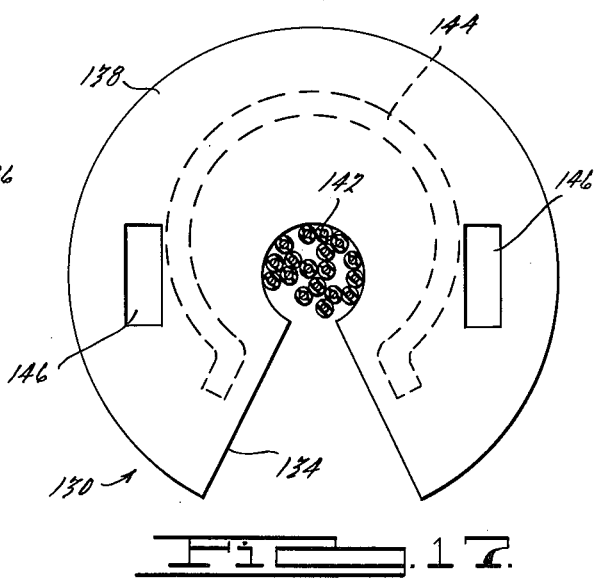
FIG. 17 is a bottom view of the embodiment shown in FIG. 16.

Slotted or "split-type" embodiments of the invention are shown in FIG. 12-18. These slots or splits can comprise merely narrow slits as shown in FIGS. 12–15, or substantial wedge-shaped openings as shown in FIGS. 16 and 17.

The slots or splits provide additional advantages for sealing members, especially grommets. The slots allow the grommets to be flexible and to expand sufficiently to allow large wires or cables, enlarged sections of the wires or cables, or bundles of wires or cables to be inserted through them more easily and without damage. Often, the wires or cables, for example, speedometer cables, have a fixture at one end thereof which is many times larger than the diameter of the cable and which must be passed through the grommet during assembly. Also, wiring harnesses comprise a plurality of wires which must be passed in one large bundle through the grommet. The slots also allow the grommets, particularly the rigid annular portions thereof, to be compressed slightly to assist in inserting them in the openings in the plates or panels.

The split-type grommets also return to their original shape after they are expanded to allow large items to be passed through them. Once they are compressed to fit more easily in the panel openings, the grommets will be held in that position by the opening and thus provide a complete seal to all solid and liquid materials.

As shown in FIGS. 12 and 14, the sealing members 100 and 102 are substantially the same as the member 10 described above, the only difference being the existence of the slots or slits 104 and 120. The members 100 and 102 are also used in the same manner as the member 10 to seal an opening and hold and position wires, cables, etc., or bundles thereof in the opening. In FIG. 12, the slot 104 is provided through both the rigid portion 106 and elastomeric body portion 108. This allows the grommet 100 to be expanded a significant amount and also possibly to have wires, cables and the like inserted in the opening 110 from the side, rather than axially. The grommet 100 can be manufactured in precisely the same manner as the member 10 described above with reference to FIGS. 3–5. After the grommet 10 is formed, the slot 104 can be cut or machined in it to form the "split-type" grommet 100. Also, the slot 104 can be formed in the grommet during manufacture by the placement of an appropriate plate 112 in the mold 114 (FIG. 13). With the latter manufacture, a final additional cutting or machining step is unnecessary.

The split-type grommet 102 shown in FIG. 14 is the same as grommet 100, except that the slot 120 is only provided in the rigid annular portion 122. The slot 120 allows the grommet 102 to be inserted easily in an opening and also allows large wires, cables and the like to be inserted easily through the grommet. Also, because the body portion 124 of the grommet 102 does not have a slot or slit in it, the grommet 102 is less susceptible to leaks. The grommet 102 can be manufactured by merely cutting the slot 120 in the rigid annular portion 12 of a sealing member 10, or a plate 126 can be inserted in the appropriate recess in the mold 128 during manufacture (as shown in FIG. 15).

Figure 18:
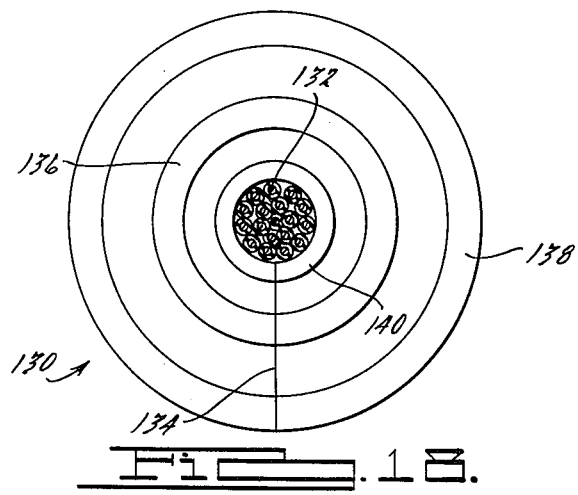
FIG. 18 illustrates the final shape of the embodiment shown in FIG. 16.

Another improved split-type grommet 130 is shown in FIGS. 16–18. This grommet is used where a bundle of wires 132 such as a wiring harness, is significantly large or consists of a number of separate wires and it is much easier to insert them into the grommet from the side rather than axially. The grommet 130 is formed essentially in the shape shown in FIG. 16. It is non-round when it is formed with a wedge-shaped slot 134 in it, but is designed such that it forms a circular shape when it is closed around the wires (as shown in FIG. 18). Once the grommet 130 is closed, it then can be inserted in a panel opening in the same manner as the other grommets and sealing members described above.

The grommet 130 has a rigid portion 136 and an elastomeric body portion 138 thereon which are similar to the corresponding rigid and body portions described earlier. An axial projection 140 having an opening 142 therein also is provided on the grommet 130 to sealingly position and hold the wires 132 in the opening. The projection 140 and opening 142 are similar in structure and function to the axial projections and openings described above (that is, adapted to be similar in structure and function when the grommet 130 is closed and ready for insertion.)

To aid and assist in closing the slot 134 and maintaining the grommet 130 in the closed position for use, a deformable ring 144 is provided in the grommet 130. The ring 144 is preferably a thin piece of malleable metal and is included into the grommet 130 when it is formed. The ring 144 is positioned in the body portion 138 of the grommet 130 and has an open side which is aligned with the slot 134. Two pockets or indentations 146 are provided in the grommet 130 on opposite sides of the ring 144. The pockets 146 allow a pair of pliers or other similar tools to be inserted therein to deform the ring 144, close the slot 134 and thus form the generally circular-shaped final grommet 130 shown in FIG. 18.

When the slot 134 is closed, the elastomeric body portion 138 situated adjacent the opening 142 swages and positions itself tightly around the outside configuration of the bundle of wires 132. In this manner, the wires 132 are securely fastened in place in the grommet 130 and a satisfactory seal is provided at the interface between the wires 132 and the grommet 130.

Figure 19:
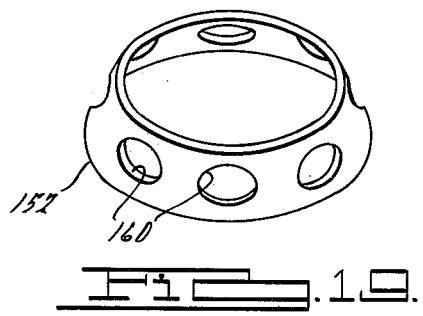
FIG. 19 illustrates an insert utilizable in the present invention.
Figure 20:
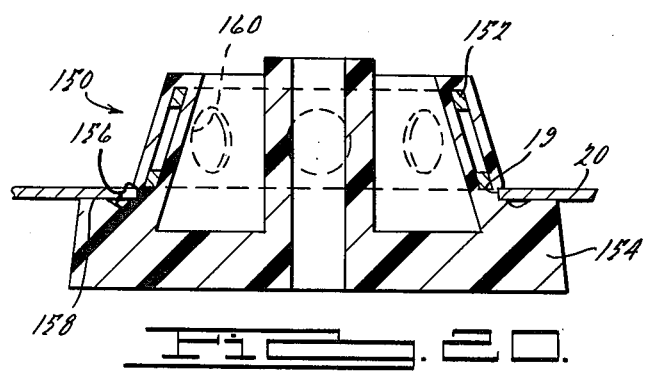
FIG. 20 is a sectional view of an embodiment of the invention utilizing the insert shown in FIG. 19.
Figure 21:
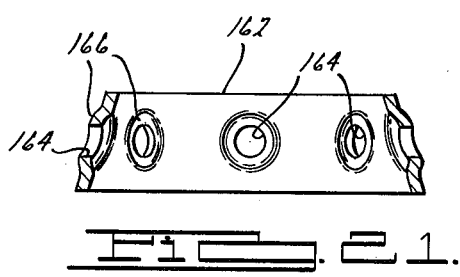
FIG. 21 illustrates another insert utilizable in the present invention.

A further improved grommet or sealing member 150 is shown in FIGS. 19–21. In this construction a rigid, non-deformable insert 152 is molded or formed in an elastomeric body 154 forming the completed member 150. The insert 152 is pre-assembled and can comprise any of the materials specified above relative to the rigid annular portion 12, or metal. The insert preferably has an annular frusto-conical shape and when combined to form member 150, provides a sealing member having most of the advantages specified above relative to the sealing member 10. The tapered upper end of the insert 152 allows the member 150 to be aligned with and inserted more readily in an opening 19 in a panel 20. The lower end of the insert 152 is slightly greater in size than the opening 19 and provides a 360° locking mechanism or ridge for the member 150 in the opening (FIG. 20). The circumferential area or sealing band surface 156 on the elastomeric portion 154 adjacent the larger end of insert 152 completely seals the opening 19 in the same manner as portion 62 described above relative to FIGS. 1–7. Also, due to the construction and shape of the sealing member 150, it can be locked into place in the opening in only one manner. If desired, a secondary sealing ridge 158 can be provided around the periphery of the member 150.

The insert 152 has a plurality of holes or openings 160 therein. These allow the elastomeric material to securely anchor the insert 152 in the completed construction 150. Another embodiment of the insert is shown in FIG. 21. The insert 162 again has a plurality of openings 164, but each opening 164 is positioned in a raised area 166 which further adds supporting and anchoring structure for the insert 162 and the completed sealing member.

The member 150 is manufactured similar to the other sealing member embodiments described above. The insert 152 (or 162) is positioned in an open-ended mold and elastomeric material is sprayed or poured around it filling the mold. The elastomeric material flows on all sides of the insert and forms a sealing member similar to that shown in FIG. 20.

Even though a metal insert may be utilized in the last described embodiment of the invention, the sealing member formed is still a marked improvement over the constructions disclosed in U.S. Pat. Nos. 3,182,119 and 3,654,382. The insertion, locking and sealing mechanisms of the present sealing members are unique and provide a significantly improved construction. Also, the design and fabrication of the molds are less expensive and less complex. Further, the inserts themselves can be manufactured and handled easier and are capable of being inserted in the molds automatically by machine.

While specific embodiments of the present invention have been illustrated and described in the foregoing specification and accompanying drawings, it is understood that the invention is not limited to the exact constructions shown, but that various alterations in the construction and arrangement of parts is possible without departing from the spirit and scope of the invention, as more particularly defined by the following claims.

I claim:

1. A grommet for sealing an opening in a panel, said grommet comprising
   an annular base portion having a continuous circumferential and axial extending sealing band surface,
   an annular locking portion having a continuous circumferential and axial extending ridge portion approximately the same diameter as said sealing band surface,
   said sealing band surface constituting an axial extending continuation of said ridge portion,
   said locking portion and said base portion being in contact with each other and integrally bonded together,
   said base portion comprising an elastomeric material and said locking portion being more rigid than said base portion,
   whereby when the grommet is installed in a panel opening, the locking position is inserted through the opening to a position on the opposite side of the panel from the base portion locking the grommet in place, and said sealing band surface forms a complete seal continuously around the entire inner periphery of the panel opening.

2. The grommet as defined in claim 1 further comprising a peripheral ridge formed on said base member and projecting axially from the outer edge of the base portion in the direction of said locking member, said peripheral ridge forming a secondary seal with a panel when the grommet is installed in a panel opening.

3. The grommet as defined in claim 2 further comprising a recess formed in said base member adjacent said peripheral ridge.

4. The grommet as defined in claim 1 further comprising an axially extending projection formed on said base member, said projection formed with an opening therein having a sealing surface for engaging a member to be supported by the grommet.

5. The grommet as defined in claim 1 wherein said locking portion is at least in part conical in shape and tapered in cross-section.

6. The grommet as defined in claim 1 wherein the material forming said base portion has a durometer hardness reading of less than 60 Shore A and the material forming said locking portion has a durometer hardness reading of more than 70 Shore A.

7. A grommet for sealing an opening in a panel; said grommet comprising
   an annular base portion having a continuous circumferential and axial extending sealing band surface,
   an annular locking portion having a continuous circumferential and axial extending ridge portion approximately the same diameter as said sealing band surface,
   said sealing band surface constituting an axial extending continuation of said ridge portion,
   said locking portion and said base portion being in contact with each other and integrally bonded together,
   said base portion comprising an elastomeric material and said locking portion being more rigid than said base portion,
   at least said locking portion having a slot therein,
   whereby when the grommet is installed in a panel opening, the locking position is inserted through the opening to a position on the opposite side of the panel from the base portion locking the grommet in place, and said sealing band surface forms a complete seal continuously around the entire inner periphery of the panel opening.

8. The grommet as defined in claim 7 wherein said slot extends through the base portion and said locking portion.

9. The grommet as defined in claim 8 wherein said slot is wedge-shaped.

10. The grommet as defined in claim 8 further comprising a deformable clamping member embedded in said base portion for closing said slot and securing it in a closed position.

11. The grommet as defined in claim 10 wherein pockets are formed in said base portion adjacent said clamping member to aid in closing said slot.

12. A grommet for sealing an opening in a panel and formed with an opening therein having a sealing surface for engaging a member to be supported by the grommet, said grommet comprising
   a base portion having a continuous circumferential and axial extending sealing surface thereon, said base portion being a resilient elastomeric material,
   an annular locking portion having a continuous circumferential ridge portion thereon, said locking portion comprising a rigid insert member integrally molded to said base portion,
   said ridge portion having substantially the same diameter as said sealing band portion and constituting an axial extending continuation thereof,
   Whereby when the grommet is installed in a panel opening, the locking portion is inserted through the opening to a position on the opposite side of the panel from the base portion locking the grommet in place, and said sealing band surface forms a complete seal continuously around the entire inner periphery of the panel opening.

13. The grommet as defined in claim 12 further comprising a peripheral ridge for forming a secondary seal with a panel when the grommet is installed in a panel opening, said peripheral ridge formed on said base member and projecting axially from the outer edge of the base portion in the direction of said locking portion.

14. The grommet as defined in claim 12 further comprising an axially extending projection formed on said base member, said opening in said grommet extending through said projection.

15. The grommet as defined in claim 12 wherein said insert member and locking portion are at least in part conical in shape.

16. The grommet as defined in claim 12 wherein said insert member has a plurality of apertures therein.

17. The grommet as defined in claim 12 wherein a slot is provided at least in said locking portion.

* * * * *

UNITED STATES PATENT AND TRADEMARK OFFICE
CERTIFICATE OF CORRECTION

PATENT NO. : 4,081,879
DATED : April 4, 1978
INVENTOR(S) : Phillip L. Rubright

It is certified that error appears in the above-identified patent and that said Letters Patent are hereby corrected as shown below:

In the abstract, line 27, "of" should be --for--. Column 1, line 52-53, delete "The recess is formed in one side to seal it with the surface of the panel." Column 11, line 47, (claim 1), "locking position" should be --locking portion--. Column 12, line 27, (claim 7), "position" should be --portion--.

Signed and Sealed this

Third Day of October 1978

[SEAL]

Attest:

RUTH C. MASON
Attesting Officer

DONALD W. BANNER
Commissioner of Patents and Trademarks